(12) United States Patent
Zhou et al.

(10) Patent No.: US 11,718,782 B2
(45) Date of Patent: Aug. 8, 2023

(54) QUANTUM DOTS BASED NANOFLUID FOR ENHANCED OIL RECOVERY IN TIGHT OIL RESERVOIR

(71) Applicant: University of North Dakota, Grand Forks, ND (US)

(72) Inventors: Yanxia Zhou, Grand Forks, ND (US); Xu Wu, Grand Forks, ND (US); Julia Xiaojun Zhao, Grand Forks, ND (US); Hui Pu, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 304 days.

(21) Appl. No.: 17/139,839

(22) Filed: Dec. 31, 2020

(65) Prior Publication Data

US 2021/0269702 A1    Sep. 2, 2021

Related U.S. Application Data

(60) Provisional application No. 62/955,860, filed on Dec. 31, 2019.

(51) Int. Cl.
*C09K 8/584* (2006.01)
*E21B 43/16* (2006.01)

(52) U.S. Cl.
CPC .............. *C09K 8/584* (2013.01); *E21B 43/16* (2013.01); *C09K 2208/10* (2013.01)

(58) Field of Classification Search
CPC ...... C09K 8/584; C09K 2208/10; E21B 43/16
See application file for complete search history.

(56) References Cited

U.S. PATENT DOCUMENTS

2010/0264371 A1* 10/2010 Nick ........................ C09D 7/69
252/301.36

* cited by examiner

*Primary Examiner* — Aiqun Li
(74) *Attorney, Agent, or Firm* — Kinney & Lange, P.A.

(57) ABSTRACT

A compound for use in oil recovery includes a quantum dot and a zwitterionic surfactant. The quantum dot has a diameter no greater than 25 nm and the quantum dot is bonded to the zwitterionic surfactant. A nanofluid for use in oil recovery includes the compound described above and a fluid carrier. A method for recovering oil from a formation includes flooding the formation with a nanofluid. The nanofluid has a quantum dot diameter no greater than 25 nm bonded to a zwitterionic surfactant and a fluid carrier.

15 Claims, 12 Drawing Sheets

QUANTUM DOTS BASED NANOFLUID FOR ENHANCED OIL RECOVERY IN TIGHT OIL RESERVOIR

STATEMENT OF GOVERNMENT INTEREST

This invention was made with government support under CHE 1709160 awarded by the National Science Foundation. The government has certain rights in the invention.

BACKGROUND

The global demand for oil and gas is projected to increase by 2-3% per year over the next few decades. Commercial and personal transportation activities, in particular, require large amounts of oil and the demands are directly tied to economic conditions. However, conventional oil recovery methods have not yet been able to fully realize the potential of the developed oil reservoirs, leaving behind about 50% of the original oil in place. Thus, the enhanced oil recovery techniques are receiving substantial attention worldwide as the available oil resources are declining.

SUMMARY

A compound for use in oil recovery includes a quantum dot and a zwitterionic surfactant. The quantum dot has a diameter no greater than 25 nm and the quantum dot is bonded to the zwitterionic surfactant.

A nanofluid for use in oil recovery includes the compound described above and a fluid carrier.

A method for recovering oil from a formation includes flooding the formation with a nanofluid. The nanofluid has a quantum dot diameter no greater than 25 nm bonded to a zwitterionic surfactant and a fluid carrier.

DETAILED DESCRIPTION

Modern oil recovery requires oil to be recovered from tight oil reservoir formations with a low porosity. These formations are also characterized by high temperature and high salinity. It is beneficial, therefore, to develop a fluid for use in recovery that is able to affect oil recovery at a very small pore size and be stable at both high temperature and high salinity. As described herein, a nanofluid comprising nanocomposites is used to increase the efficiency of oil recovery in these formations. The nanocomposites are a quantum dots with a zwitterionic surfactant absorbed onto the surface. The quantum dots can be a polymer quantum dots or silicon quantum dots. The quantum dot, either silicon or polymer quantum dots, acts as a carrier for the surfactant. The surfactant reduces the interfacial tension of the oil, deforming the oil into tiny oil drops which can be easily recovered. Therefore, the resulting nanofluid increases the efficiency of oil recovery and is stable at the high temperatures and salinity required in the tight oil reservoir formations.

Figure 1:
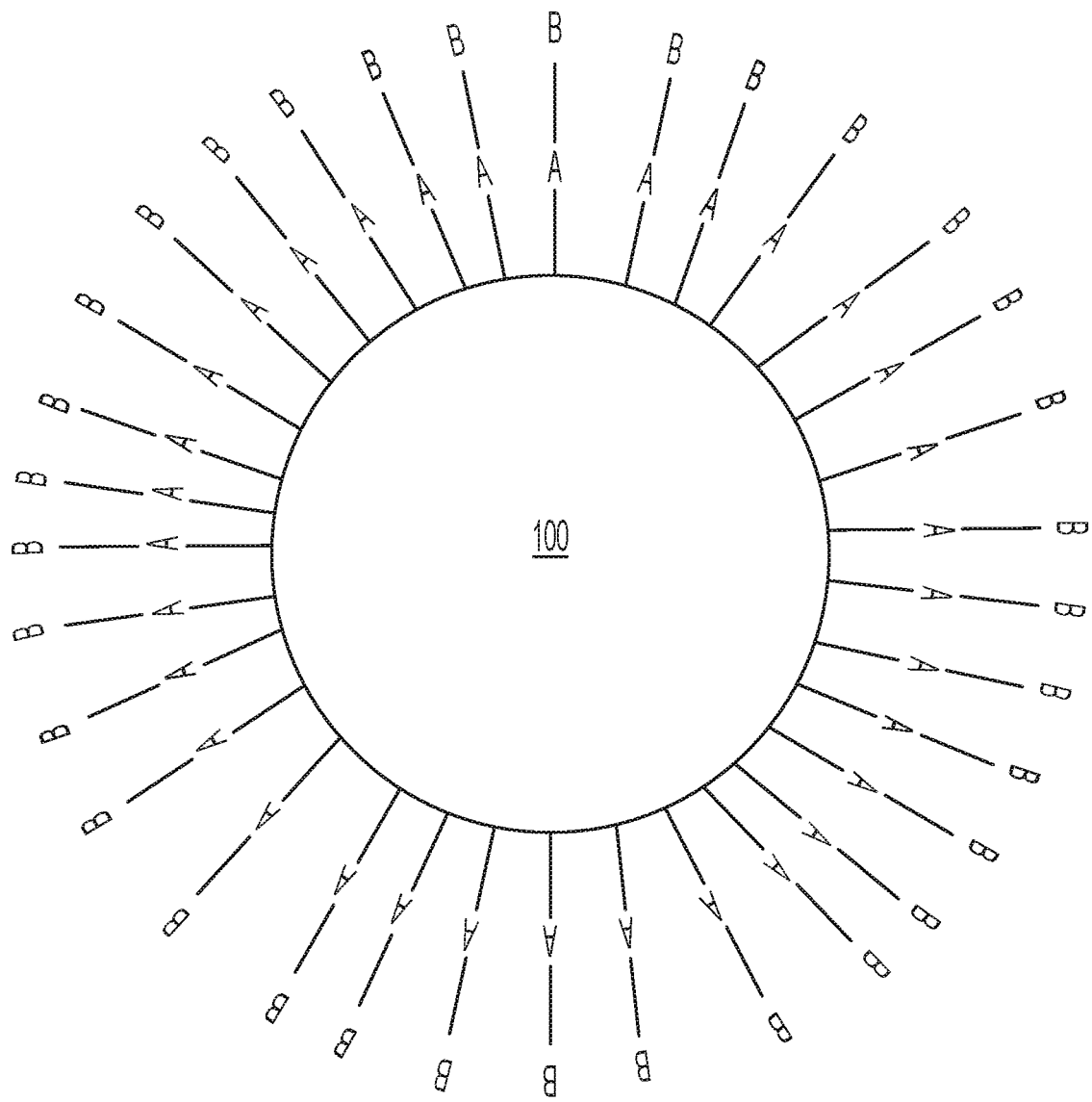
FIG. 1 is a structural representation of a nanocomposite of the nanofluid.

FIG. 1 is a structural representation of a nanocomposite of the nanofluid. FIG. 1 shows quantum dot 100, functional linkage A, and surfactant B. A nanofluid is a solution comprising quantum dots.

Quantum dot 100 is a particle between 1 nm and 100 nm diameter. In some embodiments, quantum dot 100 can be no greater than 25 nm, no greater than 20 nm, or no greater than 15 nm. In some embodiments the quantum dot is a polymer quantum dot. A polymer quantum dot is a polymer molecule between 1 nm and 100 nm in diameter. The polymer quantum dot may be a single polymer molecule or an aggregation of individual polymer molecules that, collectively, are in the nanoscale range. In some embodiments the polymer quantum dots are formed from conjugated polymers that are aggregated. The polymer quantum dots can be synthesized using poly(fluorene-alt-benzothiadiazole) and/or poly(styrene-co-maleic anhydride). In other embodiments the quantum dot is a silicon quantum dot. Silicon quantum dots are silicon particles a few nanometers in size, for example between 1 nm and 20 nm, between 1 nm and 10 nm, or between 1 nm and 8 nm.

The outer surface of the quantum dot has functional linkage A. A functional linkage is a functional group to which a surfactant can bond. The bond can be covalent, ionic, hydrogen, electrostatic, etc. In some embodiments the functional linkage is carboxylic acid or the ion thereof. In other embodiments the functional linkage is an amine or the ion thereof. Functional linkage A can be all one type of functional group or more than one type of functional group.

Surfactant B is bonded to functional linkage A. A surfactant is a substance which tends to reduce the surface tension of a liquid in which it is dissolved. Surfactant B is zwitterionic. Zwitterionic compounds are compounds which contain an equal number of a positive and negative charges, resulting in an overall neutrally charged molecule. Surfactant B can have a molecular weight of between 200 and 400. Surfactant B can contain an ammonium ion and/or a carboxylate. Surfactant B can have a number of carbon atoms in the alkyl chain between 5 and 25. In some embodiments surfactant B comprises betaine.

The nanocomposite is mixed into a fluid carrier. The fluid carrier can be any suitable solvent, for example additional surfactant, water, alcohol, organic solvent, brine, or any combination thereof. Brine is an aqueous solution containing a high concentration of salts. The salts can be, for example, sodium chloride, calcium chloride, magnesium chloride, potassium chloride, or combinations thereof. The brine can comprise a single salt or multiple types of salts. Brine can have a concentration of salt in water between 3.5 wt % and 35 wt %. In some embodiments the concentration is between 4 wt % and 20 wt %, or 5 wt % and 15 wt %. In some embodiments the brine has a composition similar to the composition found in the target tight oil reservoir formation.

When the surfactant is bonded to the quantum dot, the quantum dot acts as a carrier to transport the surfactant into the small pores of the tight oil reservoir formation. As such, the total nanocomposite size can be small enough for the nanocomposite to enter the small pore sizes, for example between 1 nm and 150 nm, between 5 nm and 125 nm, or 10 nm and 100 nm. Therefore, the size of the nanocomposite can be, for example between 1 nm and 45 nm, between 2 nm and 40 nm, or between 5 nm and 30 nm. The surfactant reduces the interfacial tension of the oil, deforming the oil into tiny oil drops which can be easily recovered.

In use, the formation is first pressure flooded with brine to remove accessible oil. Then, the formation is pressure flooded with the nanofluid mixed with brine. Then, the formation is pressure flooded again with brine. Each pressure flooding may occur at the same or different pressures. The flooding steps can be performed, for example, at between 50 psi and 3000 psi, between 75 psi and 2750 psi, or between 100 psi and 2500 psi. Each step uses a volume of nanofluid, for example 0.05 pore volume of the core sample (PV) to 2.5 PV, 0.075 PV to 2.25 PV, or 0.1 PV to 2.0 PV. The fluid can be provided at a velocity of, for example, between 0.05 mL/min and 1.0 mL/min, between 0.075 mL/min and 0.75 mL/min, or between 0.1 mL/min and 0.5 mL/min. The total volume to complete the nanofluid assisted enhanced oil recovery can be, for example, between 1.0 PV and 6.0 PV, between 1.5 PV and 5.5 PV, or between 2.0 PV and 5.0 PV.

Nanofluids described herein are stable in high temperature and high salinity environments. Stability is determined through aggregation of the nanocomposites in the nanofluid over a period of 30 days at some temperature, salinity, or both. The temperature can be 80° C. The salinity can be a 15 wt % brine solution. Aggregation occurs when the nanocomposites group together in the nanofluid and create particles which are significantly larger than the individual nanocomposites. A nanocomposite is considered to have aggregated when the particles in the nanofluid have a diameter which is 50% larger than the original particle size larger than particles in a non-aggregated nanocomposite.

Figure 2:
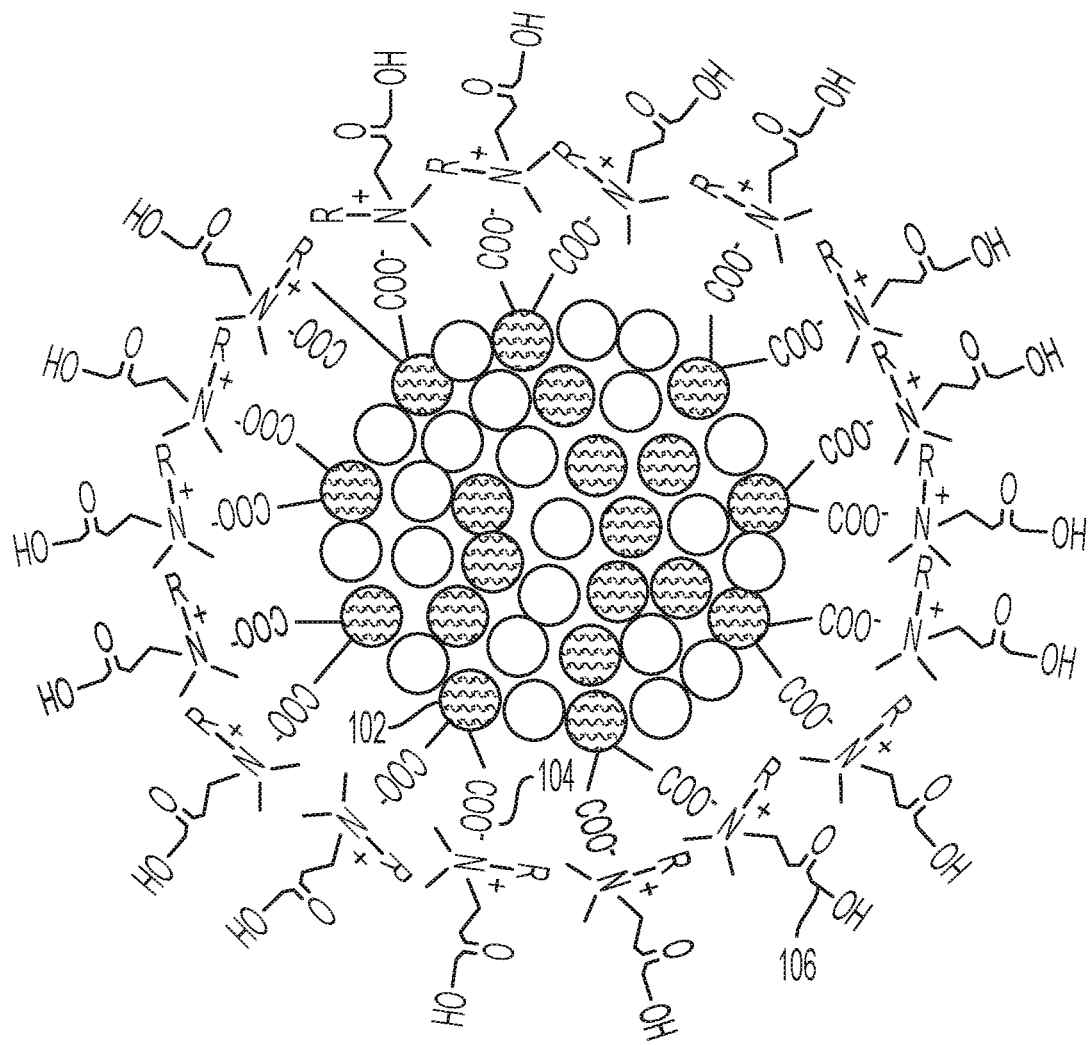
FIG. 2 is a structural representation of a representative polymer quantum dot with an attached surfactant.

FIG. 2 is a structural representation of a representative polymer quantum dot with an attached surfactant. FIG. 2 shows polymer quantum dot 102, carboxylate 104, and betaine 106. Polymer quantum dot 102 can be a single polymer molecule or an aggregation of polymer molecules. In some embodiments polymer quantum dot 102 comprises poly(fluorene-alt-benzothiadiazole), poly(styrene-co-maleic anhydride), or a combination thereof. Poly(styrene-co-maleic anhydride) can comprise the functional linkage.

Figure 3:
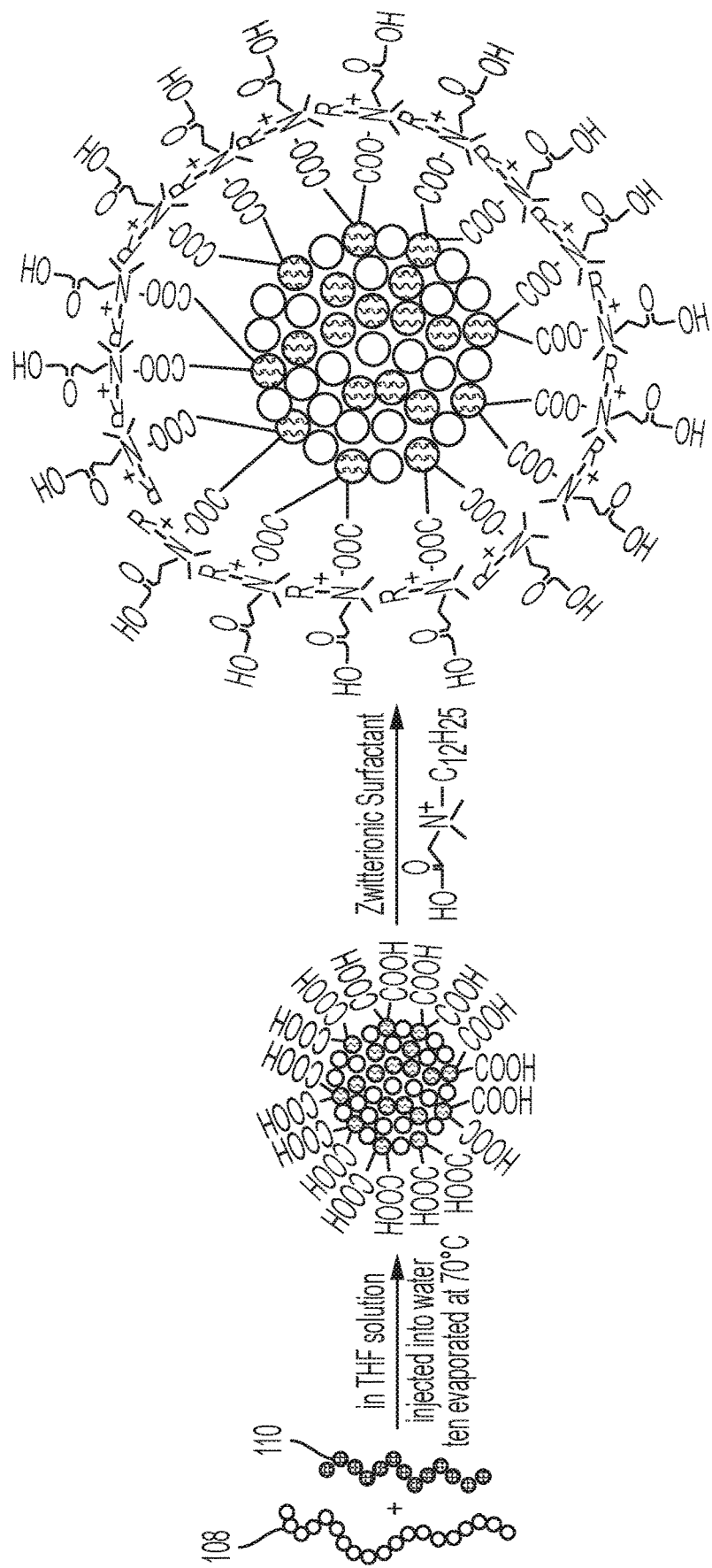
FIG. 3 is a reaction schematic for making a representative polymer quantum dot with an attached surfactant.

FIG. 3 is a reaction schematic for making a representative polymer quantum dot with an attached surfactant. First and second polymer 108, 110 are aggregated in a solvent and water. In some embodiments the polymers are poly(fluorene-alt-benzothiadiazole), poly(styrene-co-maleic anhydride), or a combination thereof. The quantum dots react with the water to form carboxyl groups on one or both polymers. In some embodiments, the carboxyl groups are formed on the poly(styrene-co-maleic anhydride). The solvent and water are then evaporated to form polymer quantum dots. The polymer quantum dots are dissolved in a zwitterionic surfactant, and the zwitterionic surfactant bonds to the carboxyl groups, to form the nanocomposite.

Figure 4:
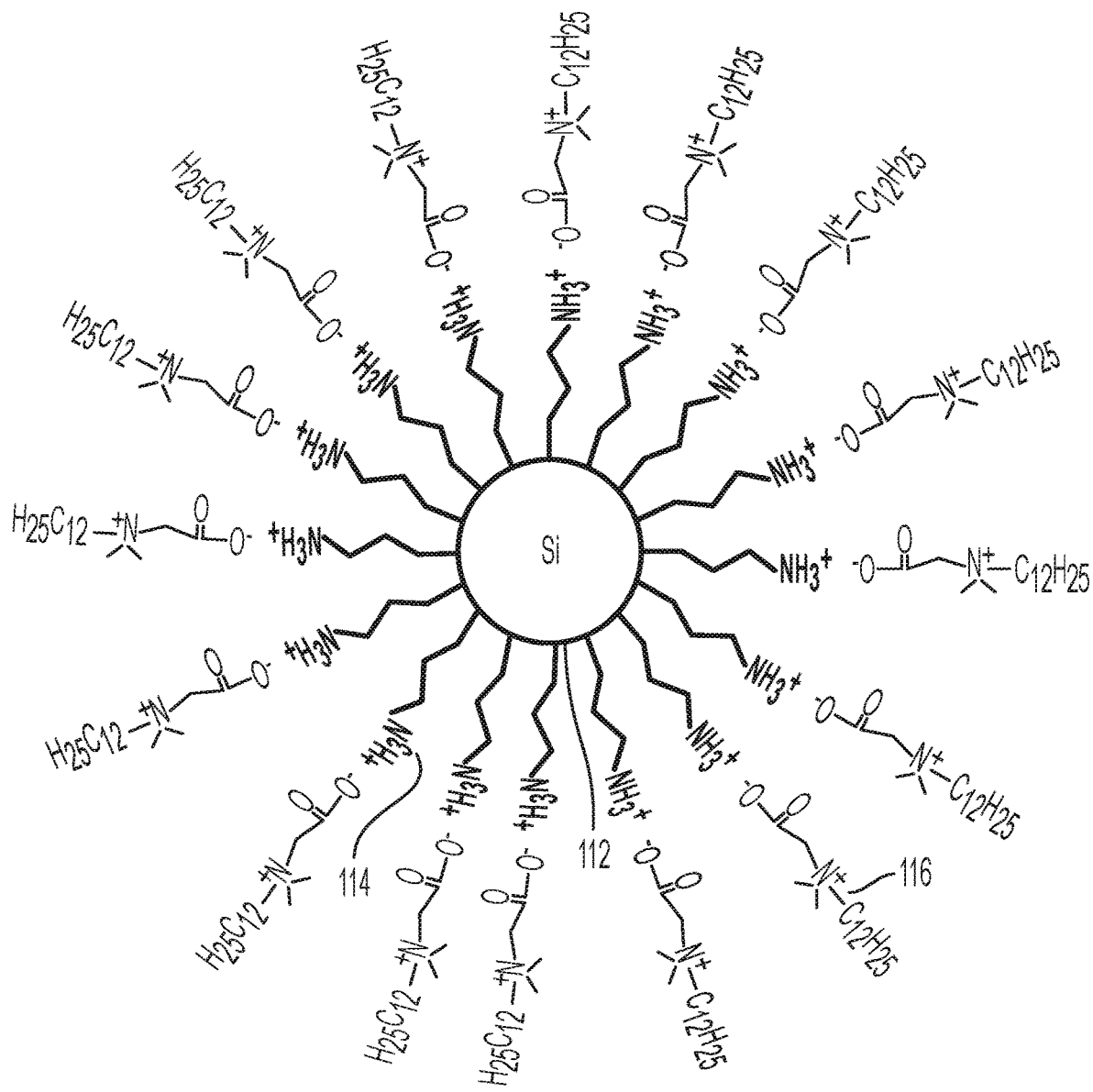
FIG. 4 is a structural representation of a representative silicon quantum dot with an attached surfactant.

FIG. 4 is a structural representation of a representative silicon quantum dot with an attached surfactant. FIG. 4 shows silicon quantum dot 112, amine ion 114, and betaine 116.

Figure 5:
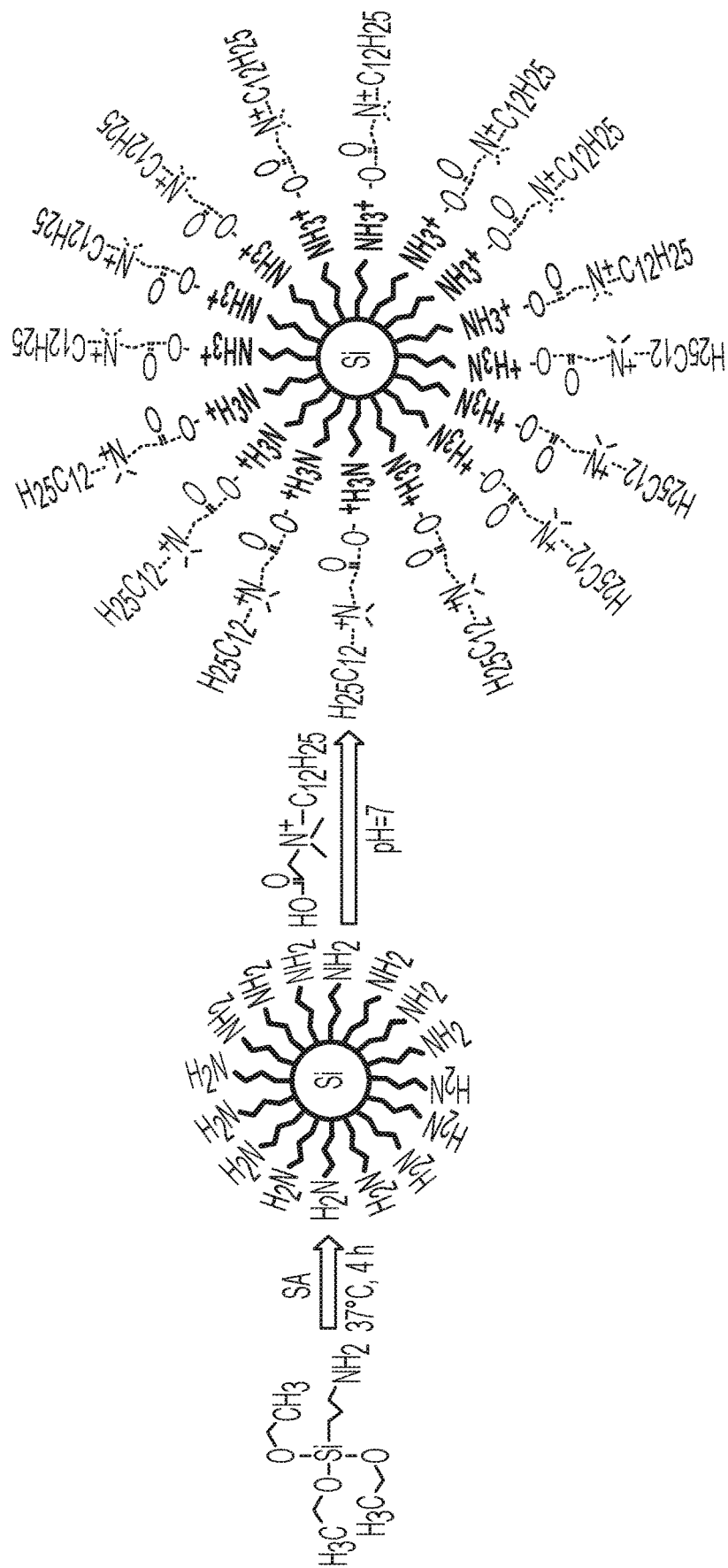
FIG. 5 is a reaction schematic for making a representative silicon quantum dot with an attached surfactant.

FIG. 5 is a reaction schematic for making a representative silicon quantum dot with an attached surfactant. 3-Aminopropyltriethoxysilane and sodium L-ascorbate are mixed in distilled water under fierce stirring. The resulting product re dewatered using a centrifugal filter. The silicon quantum dots are dissolved in a zwitterionic surfactant, and the zwitterionic surfactant bonds to the amine groups, to form the nanocomposite.

EXAMPLES

Example 1—Synthesis of Polymer Quantum Dots

The polymer quantum dots were synthesized based on a nanoprecipitation method, where conjugated polymers were firstly dissolved in a "good" solvent (e.g., THF) and added to an excess of "poor" solvent (e.g., water) under ultrasonic dispersion. 0.5 mg of PFBT and 0.1 mg of PSMA were dissolved in 5.0 mL of THF. Then the solution was injected into 10.0 mL of water under ultrasonic conditions. After 1 min of ultrasound sonication, polymer quantum dots were formed and the organic solvent THF was removed by evaporation at 70° C.

Example 2—Preparation of Polymer Quantum Dot Nanofluid

The nanofluids were prepared by adding polymer quantum dots into a betaine surfactant solution in a concentration of 0.01-0.5 wt %. The betaine surfactant was added into the solution to allow the surfactant to adsorb onto the surface of polymer quantum dots via electrostatic force to form a nanocomposite solution. The target nanofluid was prepared by adding the nanocomposite solution into simulated brine.

Example 3—Thermal Stability of Polymer Quantum Dot Nanofluid

The thermal stability of the nanofluid was tested based on the nanoparticle size measurement. Approximately 10.0 mL of the target nanofluid was placed in an oven at a constant temperature of 60° C. and 80° C. separately over a 30-day period. The size distributions of the samples were measured every 5 days to monitor if any aggregations occurred at high temperatures.

Figure 6:
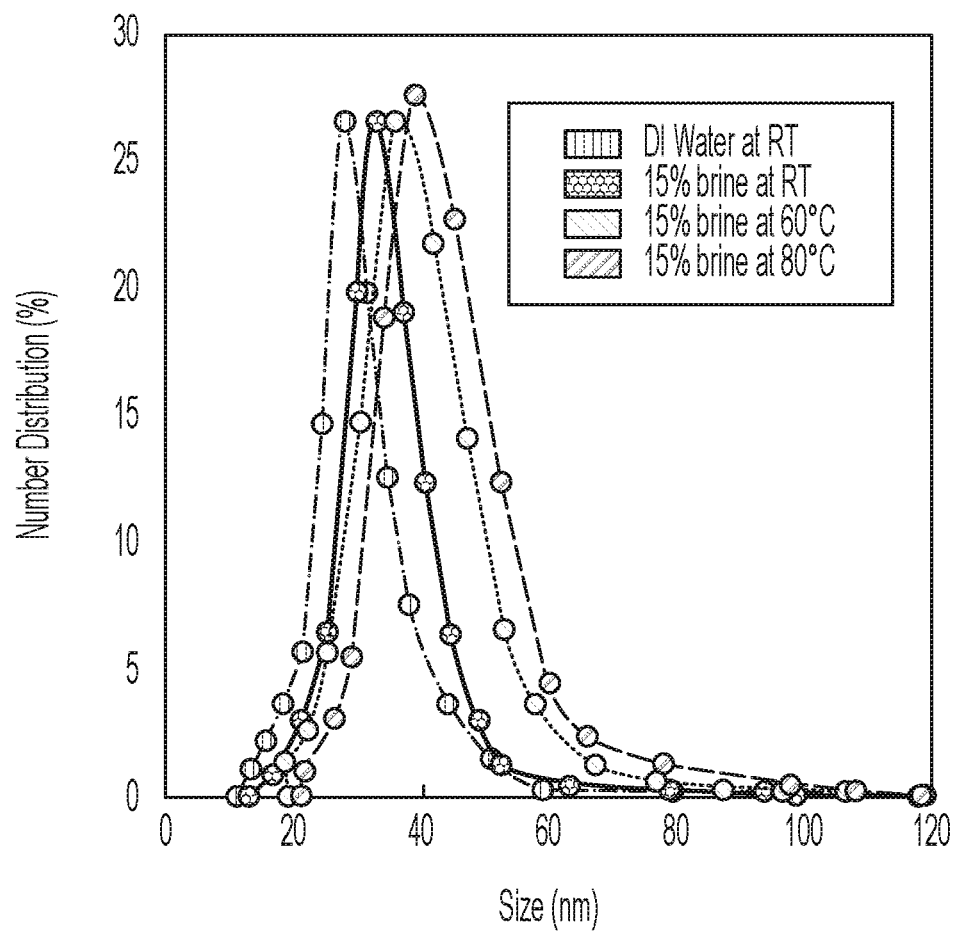
FIG. 6 is a graph of the size distribution of polymer nanocomposites at different temperatures.

The results, shown in FIG. 6, showed an average size of 27.1±1.9 nm in DI water at room temperature. The size increased to 32.0±2.2 nm in simulated brine at room temperature. The size change could be associated with the increased salinity of the solution. When the temperature increased from room temperature to 60° C. in 15 wt. % simulated brine for 24 h (FIG. 6 curve c) the size was increased to 35.0±2.8 nm. Compared to the brine at room temperature, a slight increase of about 3.0 nm was observed at 60° C. When the temperature further increased to 80° C., the size of nanocomposites was 38.1±3.2 nm. Compared to the brine at room temperature, the nanocomposite was about 6.1 nm larger, which is a 19.1% increase in their original size. The result indicated no quantum dot aggregation occurred.

Figure 7:
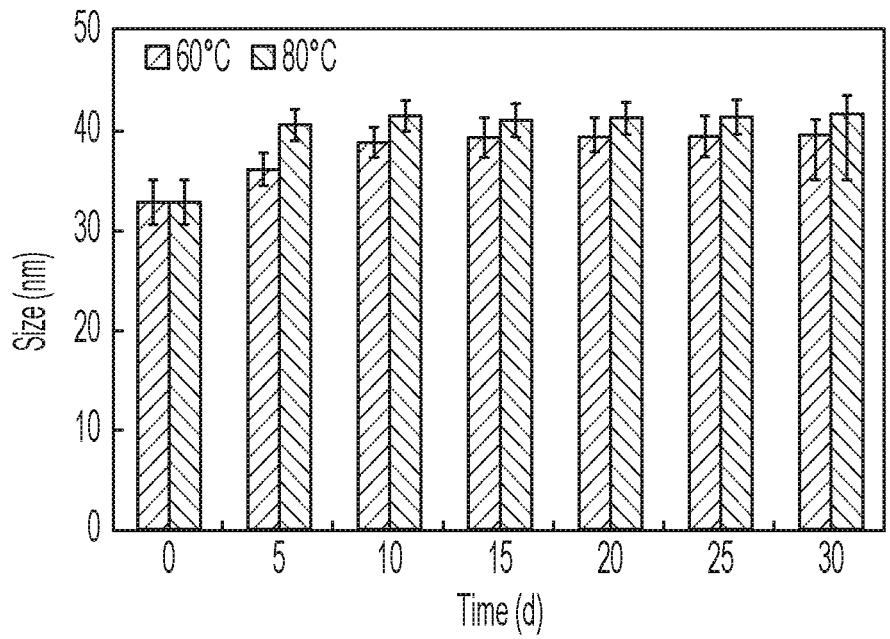
FIG. 7 is a graph of the size of polymer nanocomposites over time in an elevated temperature environment.

The stable period of particles at high temperature is important for real applications of the nanofluid in the oil fields. Thus, the thermal stability of the nanocomposite was further evaluated for a longer time period of 30 days. During this time period, the nanofluid was reserved at high temperatures of 60° C. and 80° C., respectively. Every five days, the size of the nanocomposite was measured using the same method of DLS. The results are shown in FIG. 7. After the first five days, the size of the nanocomposites increased from 32.0±2.2 nm to 36.0±1.7 nm at 60° C., and 40.4±1.6 nm at 80° C. This was about a 12.5% and 26.3% increase, respectively, in their original size. However, no obvious aggregation or sedimentation was observed. Afterwards, the particle size remained stable for both temperatures, 39.0±2.4 nm (60° C.) and 41.0±2.6 nm (80° C.), respectively. Considering 30-day is an enough of a time period for nanofluid application, no further time period was tested.

Example 4—Nanofluid Stability at High Salinity

The simulated brine was formulated using the formation water composition of the Bakken oil field. The selected ionic composition of the simulated brine is shown in Table 1. The polymer nanofluid was added to the brine at a polymer quantum dot concentration of 0.05 wt. % and betaine concentration of 0.1 wt. % at room temperature.

Figure 8:
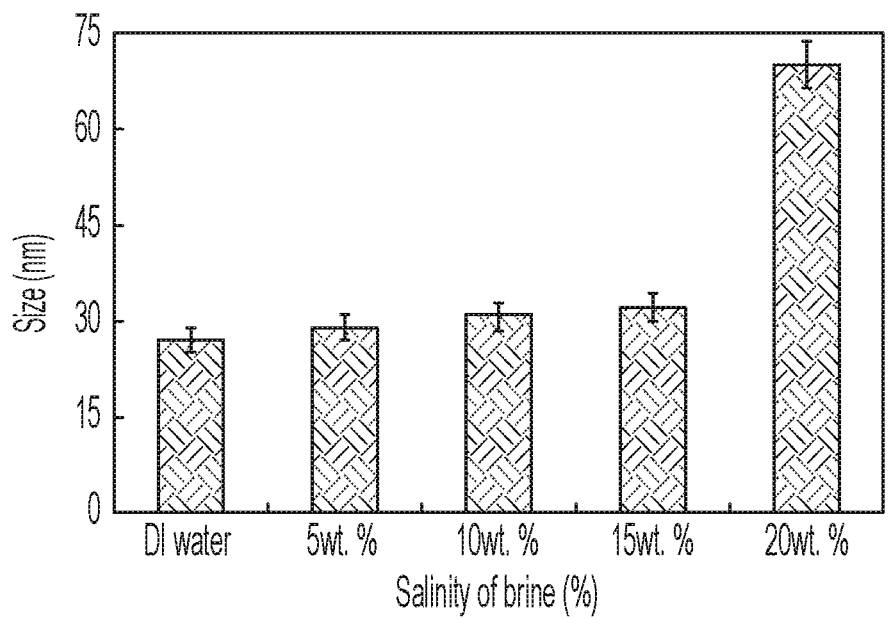
FIG. 8 is a graph of the size of polymer nanocomposites in high salinity environment.

The size of nanocomposite in different salinities of simulated brine was investigated as shown in FIG. 8. The size of nanocomposite in DI water was 27.1±1.9 nm larger than that of pure polymer quantum dots in FIG. 8 due to adsorbed surfactants on the polymer quantum dots. In Brine 1 (5% salinity) the nanocomposite size was 28.9±2.0 nm. Compared to that of 27.1±1.9 nm size in DI water, the student t-test showed no significant difference. As expected, the low salinity of 5 wt. % caused no aggregation of the nanocomposites. Similarly, the nanocomposites showed a rather stable size of 30.7±2.1 nm at 10 wt. % brine (Brine 2 in Table 1) and 32.0±2.2 nm at 15 wt. % of brine (Brine 3 in Table 1). The student t-test resulted in a p<0.05, indicating a significant difference. However, when the salinity of simulated brine increased to 20 wt. %, corresponding to Brine 4 in Table 1, the size of nanocomposite increased significantly to 70.2±3.6 nm. The student t-test indicated a similarity at p<0.001, indicating extremely a significant difference.

TABLE 1

Ionic composition of different concentrations of simulated brine

| Brine No. | $Na^+$ (mg/L) | $Ca^{2+}$ (mg/L) | $Mg^{2+}$ (mg/L) | $K^+$ (mg/L) | $Cl^-$ (mg/L) | Total (mg/L) |
|---|---|---|---|---|---|---|
| 1 | 16,131 | 2,273 | 203 | 974 | 30,419 | 50,000 (5 wt. %) |
| 2 | 32,262 | 4,547 | 405 | 1,947 | 60,838 | 100,000 (10 wt. %) |
| 3 | 48,394 | 6,820 | 608 | 2,921 | 91,258 | 150,000 (15 wt. %) |
| 4 | 64,525 | 9,093 | 811 | 3,894 | 121,677 | 200,000 (20 wt. %) |

Example 5—Interfacial Tension Between Bakken Oil and Polymer Quantum Dot Nanofluid The interfacial tension between Bakken oil and the nanofluid was tested using the inverted pendant method. After the nanofluids with different amounts of polymer quantum dots were prepared, the shape of an inverted pendant oil droplet on a needle in a bulk nanofluid phase was imaged. The interfacial tension could be calculated from the image of the drop using a drop shape analysis software that is marketed under an exclusive agreement with Ramé-Hart instrument company. All measurements were repeated three times for further analysis.

Figure 9A:
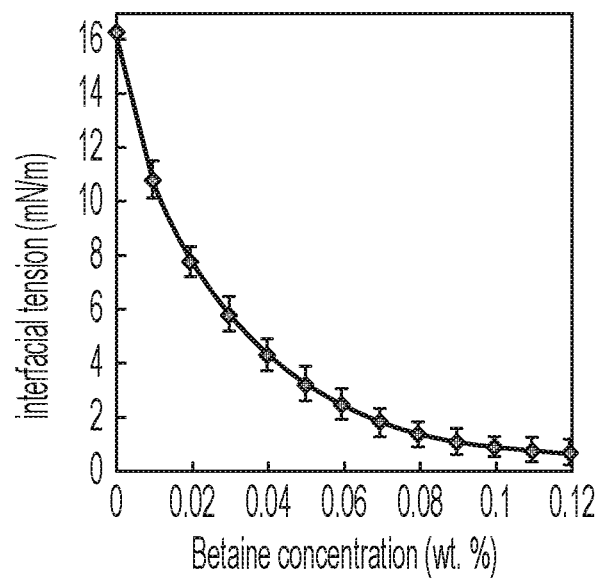
FIG. 9A is a graph of the interfacial tension of oil with betaine surfactant.

First, the betaine surfactant was tested with Bakken crude oil in 15 wt. % simulated brine at 80° C. as described above. The results are shown in FIG. 9A. Without the betaine surfactant, the oil-water interfacial tension between 15 wt. % simulated brine and the Bakken crude oil was 16.22 mN/m. When the different concentration of betaine surfactant was added to the simulated brine, the interfacial tension reduced significantly. As the 0.1 wt. % betaine surfactant was applied, the interfacial tension was reduced to a steady value of 0.83 mN/m, only 5.1% of the original value.

Figure 9B:
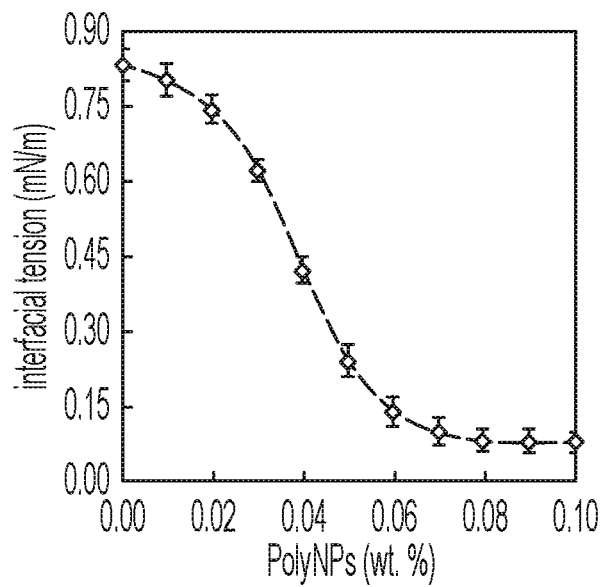
FIG. 9B is a graph of the interfacial tension of oil with polymer quantum dot based nanofluid.

Next, the interfacial tension of developed nanofluid formed by adding different amounts of polymer quantum dots into 0.1 wt. % betaine surfactant solution was further reduced (FIG. 9B). The reduction percentage was in line with the concentration of the polymer quantum dots. As the concentration of polymer quantum dots increased to 0.08 wt. %, the interfacial value reached as low as 0.082 mN/m, merely 0.51% of the original value, and achieved a steady trend. Compared with the starting point with the final point in FIG. 9B, the nanofluid significantly reduced the water-oil interfacial tension of the Bakken crude oil by 99.49%. Based on this result, we could expect the nanofluid would enhance oil recovery significantly. The concentration of polymer quantum dots in the following core flooding experiment will be selected for higher than or equal to 0.08 wt. %.

Example 6—Oil Contact Angle of Bakken Oil with Rock Samples in Polymer Quantum Dot Nanofluid The oil contact angle between the oil and Berea sample slices in the nanofluid was determined using the sessile drop method. The Berea sample slices were prepared with a diameter of ~0.3 cm and a length of ~0.1 cm for testing the contact angle. Prior to the test, these sample slices were aged in a Bakken oil at 80° C. for 10 days to ensure the rock surfaces were rendered oil-wet. The pendant oil droplets could be captured on the oil-wet surface of Berea sample slices in a bulk nanofluid phase at 80° C. by a high-resolution camera. The oil contact angles were calculated using a drop image analysis software the same as above mentioned. All measurements were repeated three times for further analysis.

Figure 10A:
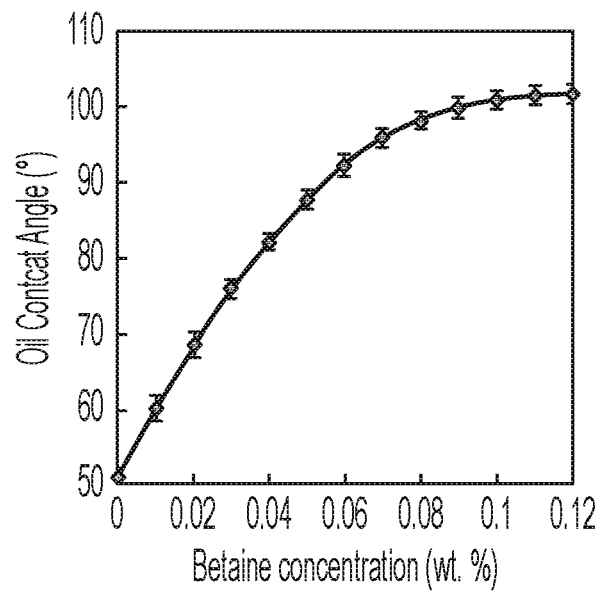
FIG. 10A is a graph of the contact angle of oil with betaine surfactant.

The original contact angle in the simulated brine without the betaine surfactant was measured to be 51.3° (FIG. 10A), indicating the oil-wet surface. With the increase of the betaine surfactant concentration, the contact angle increased rapidly. When the surfactant concentration reached 0.07 wt. %, the contact angle increasing extent became insignificant. Eventually, the contact angle reached 101.3° when the concentration of betaine surfactant was 0.12 wt. %, increasing by 97.47% compared to the original value. In the following core flooding test, the concentration of betaine surfactant was chosen to be ≥0.07 wt. %. Combined with interfacial tension test result, the concentration of betaine surfactant was chosen to be 0.1 wt. % eventually.

Figure 10B:
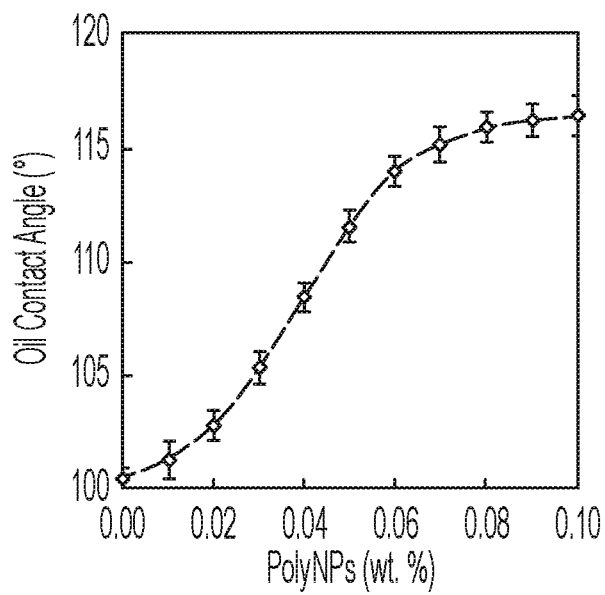
FIG. 10B is a graph of the contact angle of oil with polymer quantum dot based nanofluid.

The contact angel of the polymer quantum dots based nanofluid was then measured (FIG. 10B). At the starting point without quantum dots, the contact angle was 100.5° indicating that betaine surfactant alone could have altered the oil-wet formation to an intermediate wet. When the polymer quantum dots concentration was lower than 0.06%, the contact angle of the nanofluid continually increased with increased concentration of the polymer quantum dots. Then, the contact angle increased slowly in the concentration range of 0.06% to 0.10% of the polymer quantum dots. Finally, the oil contact angle slowly reached a plateau of 115.8° after 0.08% of the quantum dots was used, indicating the water-wet formation. In the following experiments, the concentration of polymer quantum dots was 0.08 wt. % in the nano-fluid. Compared with the simulated brine, the wettability of the oil saturated Berea core sample was significantly changed from oil-wet to water-wet. The quantum dots played a significant role in this wettability transition.

Example 7—Core Flooding of Formation Samples with Polymer Quantum Dot Nanofluid

The organic matter and adsorbed substances on the cores were cleaned with toluene and ethanol prior to the displacement experiment. In order to obtain a constant weight, the samples were dried at 80° C. for 48 h. Then, the sample was cooled down to room temperature in a desiccator and the weights were measured. To remove the gas inside the core samples, the samples were vacuumed for 24 h. Then the porosity and gas permeability were tested using a porosimeter and a gas permeameter, respectively. The Berea core sample was first saturated with simulated brine before it was saturated with oil. Therefore, to fully saturate the Berea core samples by the formation of water, the core samples were injected with 200.0 mL of simulated brine at a flow rate of 0.1 mL/min. The pore volume (PV) was determined by measuring the weight difference before and after brine saturation divided by the density of simulated brine. After brine saturation, the core samples were oil saturated by injecting 10 PV Bakken oil at a flow rate of 0.1 mL/min to sufficiently saturate the core sample with oil. Then the original oil in place (OOIP) was determined by the volume of water displaced.

After brine and oil saturation the Berea core samples established the initial oil saturation and the irreducible water saturation. Then they were put in the Bakken oil at 80° C. for one week to allow the polar substances, such as colloid and asphaltene in crude oil, to reach adsorption equilibrium on the surface of the rock pores. Prior to the core flooding experiment, the core sample in a Viton sleeve was placed into the core holder. The core holder was then sealed at both ends and was placed in the oven. With a fixed oil injection rate of 0.3 mL/min at a constant temperature of 80° C., the silicone oil between the core holder and rubber sleeve would provide a stable pressure of 10 MPa, at this moment the core flooding test started. The experiment was conducted as follows: 1 PV brine flooding; then 0.5 PV chemical flooding; finally, 1.5 PV subsequent brine flooding. During the chemical flooding, the betaine surfactant dissolved in simulated brine was used as the control for the nanofluid to compare the oil recovery in core flooding. The pressure difference between the displacement fluid inlet and produced liquid outlet was recorded automatically using a pressure sensor. The volume of oil and water displaced from core samples were recorded every five minutes.

The nanofluid was applied to the core flooding experiment using the oil saturated Berea core samples. The 0.1 wt. % betaine surfactant was prepared as a control for the nanofluid. As described above, the core flooding experiments were carried out using three flooding steps. The first step was simulated brine flooding and the second step was chemical flooding (nanofluid flooding or the control of surfactant flooding) and the third step was subsequent brine flooding. The oil recovery results are shown in Table 3. At the beginning, the first flooding of simulated brine flooding was performed. The oil recoveries of the two rock samples in this flooding process were very close (45.80% and 46.56%), which indicated that one rock could be used as a control for the other rock. Thus, the rock sample C1 was conducted with surfactant flooding. The result showed an enhanced oil recovery of 7.91%. Meanwhile, the rock sample C2 was conducted with nanofluid flooding. The oil recovery was enhanced by 15.03%. This result was 7.12% higher than that of surfactant flooding in the second flooding process. Finally, a subsequent brine flooding was conducted for both rock samples. Comparing with the surfactant flooding in rock C1, the nanofluid flooding in rock C2 enhanced oil recovery by 1.44% in this subsequent brine flooding step. In total, the oil recovery was 66.51% when the nanofluid was used in the second flooding step while a lower recovery of 57.51% was obtained when the surfactant was used in the same step without polymer quantum dots. This result indicates that the polymer quantum dots based nanofluid is a highly promising oil displacing agent for enhanced oil recovery.

TABLE 3

| Oil recovery of core flooding test Oil recovery (%) | | | | |
|---|---|---|---|---|
| Rock core sample | $1^{st}$ flooding (Brine flooding) | $2^{nd}$ flooding (Chemical flooding) | $3^{rd}$ flooding (Subsequent brine flooding) | Total recovery |
| C1 | 45.80 | 7.91 | 3.48 | 57.19 |
| C2 | 46.56 | 15.03 | 4.92 | 66.51 |

Example 8—Synthesis of Silicon Quantum Dots

The synthesis of silicon quantum dots was based on a "green" one-step synthesis method. 3-Aminopropyltriethoxysilane (APTES) and Sodium L-ascorbate (SA) were used as the Si source and the reduction reagent to prepare silicon quantum dots since SA has higher reduction property. Briefly, 2 mL APTES and 2.5 mL 0.1M SA were mixed in 8 mL distilled water under fierce stirring (≥1, 200 rpm) at 37° C. for 4 h. After that, excess chemical reagents including APTES and SA were fully removed by a centrifugal filter whose molecular weight cut-off equals 3 kDa of MWCO at 8, 000 rpm ultrafiltration for 3 times.

Example 9—Preparation of Silicon Quantum Dot Nanofluid

The silicon quantum dot based nanofluid was prepared by adding different amounts of silicon quantum dots into the betaine surfactant solution, and then the mixture was dissolved in simulated brine. First, the pH value of synthesized silicon quantum dots was adjusted to around 7.0, because the pH value of most reservoir formations is around 7. Second, the distilled nanofluid was prepared by adding betaine surfactant to the silicon quantum dots with the pH value of 7.0. The surfactant was adsorbed onto the surface of silicon quantum dots via electrostatic force after 2 h magnetic stirring and 2 h ultrasonic. Last, the distilled nanofluid was dissolved in the simulated brine according to Bakken formation water ion composition.

Example 10—Thermal Stability of Silicon Quantum Dot Nanofluid

Figure 11:
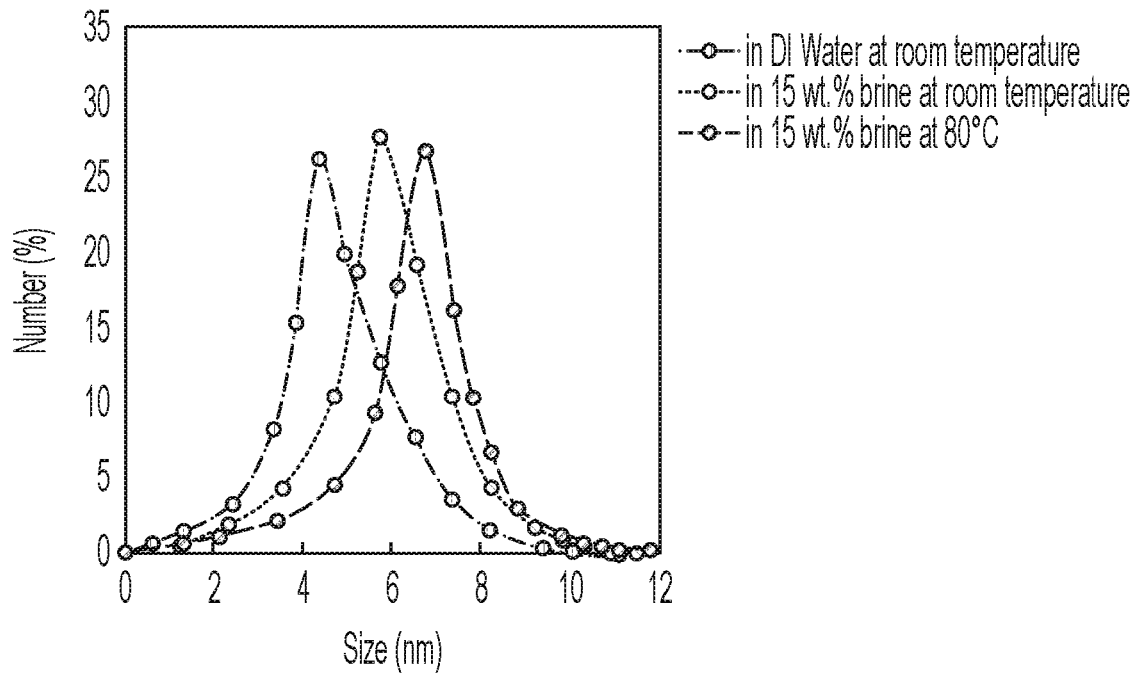
FIG. 11 is a graph of the size distribution of silicon quantum dot nanocomposites at different temperatures.
Figure 12:
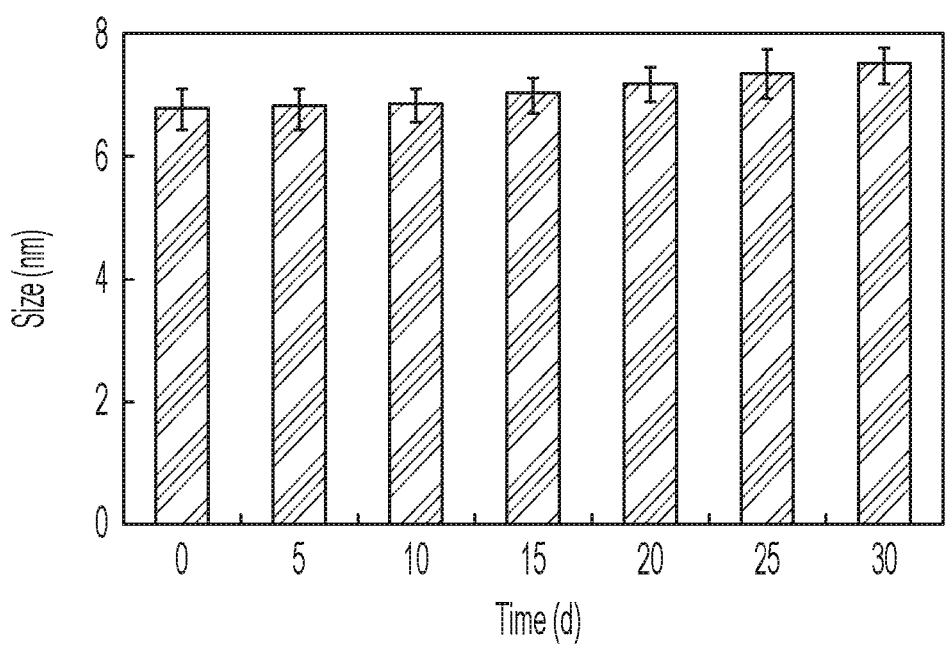
FIG. 12 is a graph of the size of silicon quantum dot nanocomposites over time in an elevated temperature environment.

The quantum dot size and interfacial tension (IFT) measurements were applied to test the nanofluid thermal stability. A bottle of 10 mL the nanofluid was placed in an oven at a constant temperature of 80° C. for 30 d. In order to observe whether the nanofluid is stable, the size and the IFT of the samples was tested every 5 days. In the IFT with temperature measurements An average size of 4.3±1.1 nm was obtained in DI water at room temperature (FIG. 11). The size changed to 5.7±1.3 nm when in 15 wt. % of simulated brine at room temperature for 24 h. When the temperature increased to 80° C. in 15 wt. % simulated brine for 24 h, the size changed to 6.7±1.5 nm. The measurement of hydrodynamic dynamiter was determined to evaluate the nanofluid thermal stability in 15 wt. % simulated brine at 80° C. for 30 d, as shown in FIG. 12. The particle size of nanofluid was always around 7 nm, which proved the nanofluid was stable.

Example 11—Stability of Silicon Quantum Dot Nanofluid in High Salinity

The simulated brine was formulated using the formation water composition of the Bakken oil field. The selected ionic composition of the simulated brine is shown in Table 1. The silicon quantum dot nanocomposite was added to the brine at a silicon quantum dot nanocomposite concentration of 0.1 wt. % and betaine concentration of 0.1 wt. % at room temperature.

Figure 13:
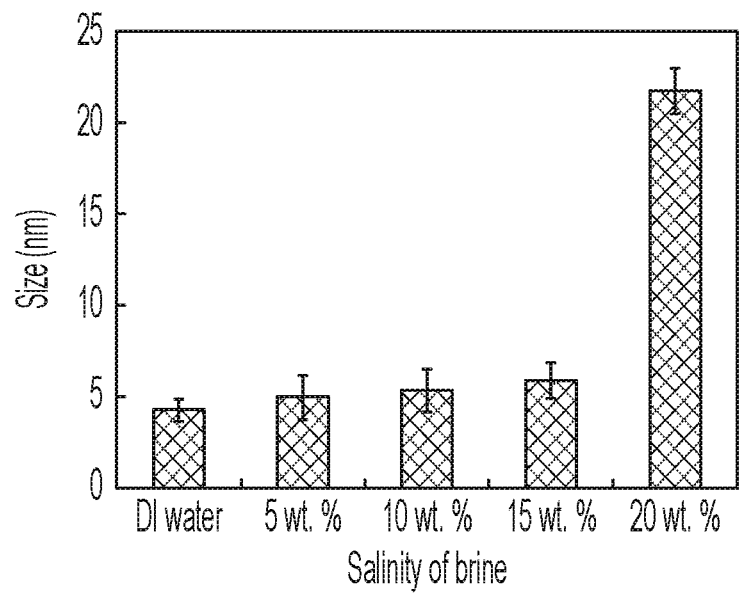
FIG. 13 is a graph of the size of silicon quantum dot nanocomposites in high salinity environment.

As shown in FIG. 13, the size of nano-composition does not significantly increase in simulated brines with a salinity of less than 20 wt. %.

Example 12—Interfacial Tension Between Bakken Oil and Silicon Quantum Dot Nanofluid The interfacial tension between Bakken oil and the oil displacement agents including surfactant and nanofluid was tested using the spinning drop method. In this method, a horizontally arranged capillary filled with a bulk phase and a specifically lighter oil drop phase was set in rotation. The diameter or curvature of the drop which is elongated by centrifugal force correlates with the interfacial tension. In order to minimize the error due to the curvature of the interface, the length of the drop along the axis of rotation must be at least four times the diameter of the drop. Then the interfacial tension can be calculated from the measured drop diameter with a given speed of rotation and with known densities of the two phases. All measurements were repeated three times.

Figure 14:
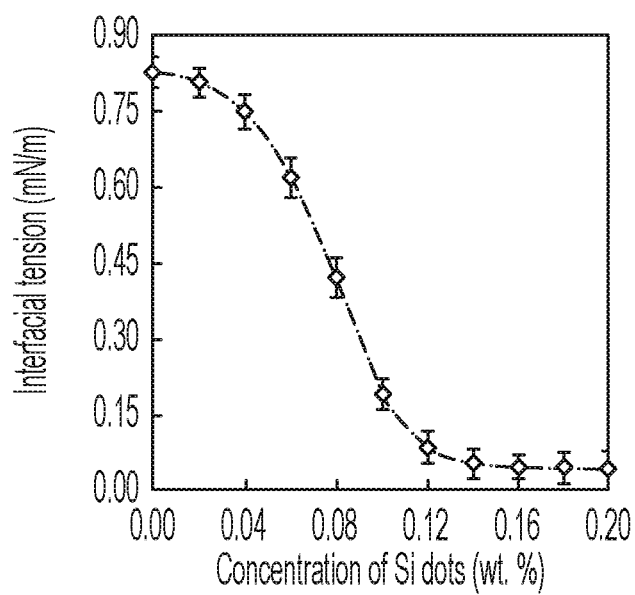
FIG. 14 is a graph of the interfacial tension of oil with silicon quantum dot based nanofluid.

As shown in FIG. 14, when there were no silicon quantum dots and only betaine the interfacial tension of the fluid is 0.83 mN/m. With the increase of silicon quantum dot concentration, the interfacial tension between Bakken oil and simulated brine dropped rapidly and achieved to 0.085 mN/m when the concentration of silicon quantum dots was 0.12 wt. %. That meant the nanofluid reduced the interfacial tension by 89.76% comparing with betaine surfactant. After that, the interfacial tension fell very slowly and appeared a plateau.

Example 12—Oil Contact Angle of Bakken Oil with Rock Samples in Silicon Quantum Dot Nanofluid The oil contact angle between the Bakken oil and the Bakken core sample slices in the nanofluid was determined using the sessile drop method. The Bakken sample slices were prepared with a diameter of ~0.5 cm and a length of ~0.1 cm for testing the contact angle. Prior to the test, these sample slices were aged in Bakken oil at 80° C. and atmospheric pressure for 10 days and later dried in an oven for 1 day at 80° C. First, the Bakken core sample slice was stuck onto a handle and insert them from the top of the chamber. And the chamber was equipped with O-rings for sealing at each connection. Around the chamber, there are electrical resistance wires to heat the chamber for controlling the temperature of tested fluids. At the lower middle part of the chamber, there is an entrance to pump the used fluid. After the fluid was pumped inside, the entrance was closed. At the bottom of the chamber, there is an entrance to pump the Bakken oil. When the Bakken oil was pumped inside, there was a pendant oil drop onto the Bakken core sample slices. At right side of the chamber, there was a camera whose center is as high as the chamber. The oil droplet was captured on the oil-wet surface of Bakken core sample slices in a bulk nanofluid phase at 80° C. by the high resolution camera on right side of the chamber. The contact angle was calculated from the image of the oil drop using a drop shape analysis by a Drop Image software which is a program system contact angle measurement by image analysis and is a proprietary product of Finn Knut Hansen and is marketed under an exclusive agreement with Ramé-Hart instrument company. All measurements were repeated three times.

Figure 15:
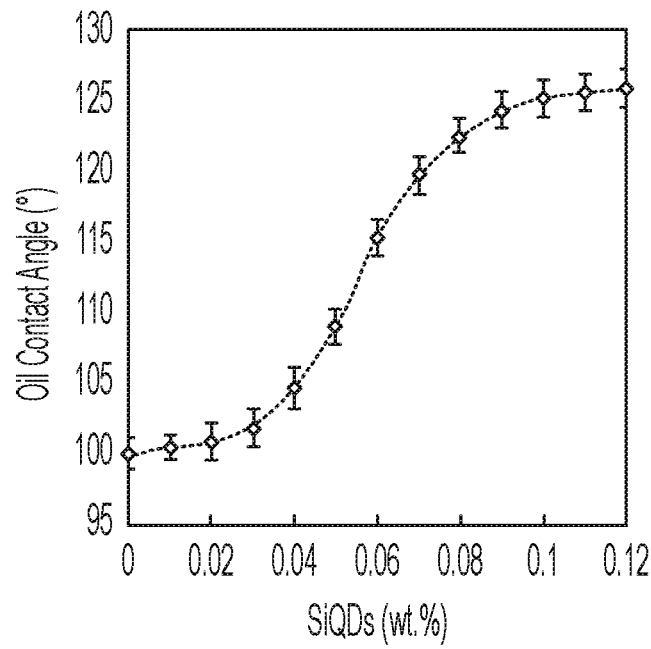
FIG. 15 is a graph of the contact angle of oil with silicon quantum dot based nanofluid.

As shown in FIG. 15, when there were no silicon quantum dots, and there was only betaine in simulated brine, the original contact angle among Bakken oil, 15 wt. % simulated brine and Bakken rock was 100.1°. With the increase of silicon quantum dot concentration, the contact angle of nanofluid increased and achieved to 124.1° when the silicon quantum dot concentration reached 0.09 wt. %. After that, the contact angle increased slowly and formed a plateau.

Example 13—Core Flooding of Formation Samples with Silicon Quantum Dot Nanofluid Prior to the core flooding, the Bakken core samples were saturated in oil. After the oil displacement agent was put into the container, the oil saturated Bakken core sample was wrapped by a rubber sleeve both put into the core holder, and the confining pressure outside the rubber sleeve at 80° C. set around 20 Mpa, the core flooding experiment was started. The experimental program was carried out as follows: 0.5 PV simulated brine flooding; then 0.5 PV chemical flooding; finally, 0.5 PV subsequent simulated brine flooding at a constant flow and temperature of 0.15 mL/min and 80° C. The betaine surfactant solution was used as the control. The volume of produced oil and water and the pressure difference between the injection end and the production end of the core were recorded every a few minutes.

Figure 16:
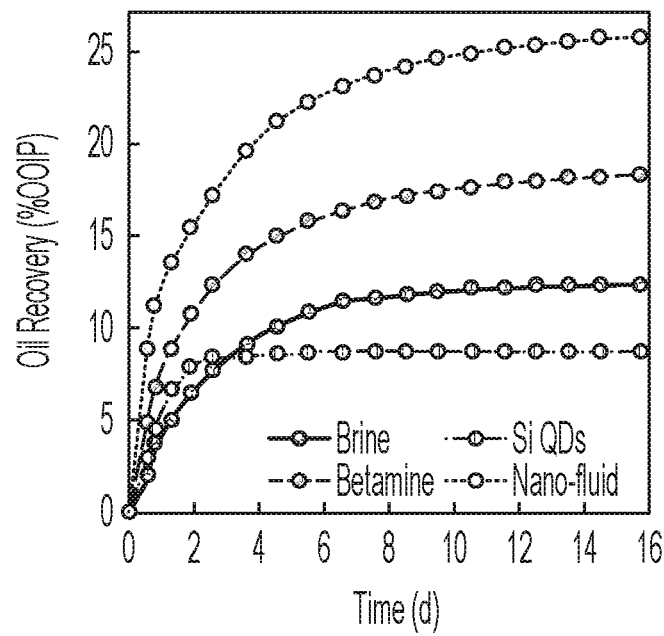
FIG. 16 is a graph of the oil recovery for various liquids over time.

Three controls of silicon quantum dots based nanofluid were prepared including 15 wt. % simulated brine, silicon quantum dot solution, and 0.1 wt. % betaine surfactant. As shown in FIG. 16, the final oil recoveries of the control of 15 wt. % simulated brine was 12.33%, silicon quantum dots was 8.68%, and 0.1 wt. % betaine was 18.23% of original oil in place, respectively. The oil recovery of the nanofluid reached 25.72% of original oil in place. This result indicated that the developed nanofluid is a beneficial oil displacement agent for enhanced oil recovery.

Discussion of Possible Embodiments

The following are non-exclusive descriptions of possible embodiments of the present invention.

A compound for use in oil recovery, the compound comprising: a quantum dot having a diameter no greater than 25 nm; and a zwitterionic surfactant; wherein the zwitterionic surfactant is bonded to the quantum dot.

The compound of the preceding paragraph can optionally include, additionally and/or alternatively, any one or more of the following features, configurations and/or additional components:

A further embodiment of the foregoing compound wherein the quantum dot is a polymer quantum dot.

A further embodiment of any of the foregoing compound wherein the polymer quantum dot is comprises poly(fluorene-alt-benzothiadiazole) and poly(styrene-co-maleic anhydride).

A further embodiment of any of the foregoing compound wherein the quantum dot is a silicon quantum dot.

A further embodiment of any of the foregoing compound wherein the compound does not aggregate below 90° C. for at least 30 days.

A further embodiment of any of the foregoing compound wherein the compound does not aggregate in a saline solution of no greater than 15 wt % brine.

A further embodiment of any of the foregoing compound wherein the zwitterionic surfactant is bonded to the quantum dot through a covalent bond.

A further embodiment of any of the foregoing compound the zwitterionic surfactant is bonded to the quantum dot through noncovalent adsorption.

A further embodiment of any of the foregoing compound wherein the zwitterionic surfactant comprises a betaine zwitterionic surfactant.

Some embodiments relate to a nanofluid for use in oil recovery, the nanofluid comprising: the compound described above; and a fluid carrier.

The nanofluid of the preceding paragraph can optionally include, additionally and/or alternatively, any one or more of the following features, configurations and/or additional components:

A further embodiment of any of the foregoing nanofluids wherein the fluid carrier comprises water.

A further embodiment of any of the foregoing nanofluids wherein the fluid carrier comprises a brine.

A further embodiment of any of the foregoing nanofluid wherein the compound of claim 1 has a concentration in the fluid carrier between 0.01 wt % and 0.10 wt %.

Some embodiments relate to a method for recovering oil from a formation, the method comprising: flooding the formation with a nanofluid, the nanofluid comprising a quantum dot having a diameter no greater than 25 nm bonded to a zwitterionic surfactant and a fluid carrier to form a chemically flooded formation.

The method of the preceding paragraph can optionally include, additionally and/or alternatively, any one or more of the following features, configurations and/or additional components:

A further embodiment of any of the foregoing methods further comprising flooding the chemically flooded formation with a brine.

A further embodiment of any of the foregoing methods further comprising flooding the formation with a brine prior to flooding the formation with the nanofluid.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A compound for use in oil recovery, the compound comprising:
    a quantum dot having a diameter no greater than 25 nm;
    a zwitterionic surfactant; and
    a functional linkage on the quantum dot, the functional linkage comprising one of:
        an amine or an ion thereof; and
        carboxylic acid or an ion thereof;
    wherein the zwitterionic surfactant is bonded to the quantum dot via the functional linkage.

2. The compound of claim 1 wherein the quantum dot is a polymer quantum dot.

3. The compound of claim 2 wherein the polymer quantum dot comprises poly(fluorene-alt-benzothiadiazole) and poly(styrene-co-maleic anhydride).

4. The compound of claim 1 wherein the quantum dot is a silicon quantum dot.

5. The compound of claim 1 wherein the compound does not aggregate below 90° C. for at least 30 days.

6. The compound of claim 1 wherein the compound does not aggregate in a saline solution of no greater than 15 wt % brine.

7. The compound of claim 1 wherein the zwitterionic surfactant is bonded to the quantum dot through a covalent bond.

8. The compound of claim 1 wherein the zwitterionic surfactant comprises a betaine zwitterionic surfactant.

9. A nanofluid for use in oil recovery, the nanofluid comprising:
    the compound of claim 1; and
    a fluid carrier.

10. The nanofluid of claim 9 wherein the fluid carrier comprises water.

11. The nanofluid of claim 9 wherein the fluid carrier comprises a brine.

12. The nanofluid of claim 9 wherein the compound of claim 1 has a concentration in the fluid carrier between 0.01 wt % and 0.10 wt %.

13. A method for recovering oil from a formation, the method comprising:
    flooding the formation with a nanofluid, the nanofluid comprising a quantum dot having a diameter no greater than 25 nm bonded via a functional linkage on the quantum dot to a zwitterionic surfactant and a fluid carrier to form a chemically flooded formation;
    wherein the functional linkage comprises one of:
        an amine or an ion thereof; and
        carboxylic acid or an ion thereof.

14. The method of claim 13, further comprising flooding the chemically flooded formation with a brine.

15. The method of claim 13, further comprising flooding the formation with a brine prior to flooding the formation with the nanofluid.

* * * * *